(12) United States Patent
Zeng et al.

(10) Patent No.: US 8,027,127 B2
(45) Date of Patent: Sep. 27, 2011

(54) METHOD OF REDUCING SLIDER ROLL TORQUE BY BALANCING HEAD GIMBAL ASSEMBLY FOR IMPROVED SEEKING PERFORMANCE

(75) Inventors: Qinghua Zeng, Fremont, CA (US); Yen Fu, San Jose, CA (US); Li-Yan Zhu, San Jose, CA (US); Chao-Hui Yang, Milpitas, CA (US); Ellis T. Cha, San Ramon, CA (US)

(73) Assignee: SAE Magnetics (HK) Ltd., Shatin, N.T. (HK)

( * ) Notice: Subject to any disclaimer, the term of this patent is extended or adjusted under 35 U.S.C. 154(b) by 0 days.

(21) Appl. No.: 12/932,551

(22) Filed: Feb. 28, 2011

(65) Prior Publication Data
US 2011/0146047 A1 Jun. 23, 2011

Related U.S. Application Data

(62) Division of application No. 11/691,437, filed on Mar. 26, 2007, now Pat. No. 7,907,368.

(51) Int. Cl.
*G11B 5/55* (2006.01)
(52) U.S. Cl. .................. 360/245; 360/245.3; 360/245.7

(58) Field of Classification Search ....... 360/230–237.1, 360/254–256.6, 264–267.9, 274, 294–294.7, 360/244–246.8
See application file for complete search history.

(56) References Cited

U.S. PATENT DOCUMENTS

| | | | |
|---|---|---|---|
| 5,936,803 A * | 8/1999 | Berding | 360/244.8 |
| 6,125,017 A | 9/2000 | Misso et al. | |
| 6,549,376 B1 | 4/2003 | Scura et al. | |
| 6,785,096 B2 * | 8/2004 | Kuwajima et al. | 360/294.4 |
| 6,995,953 B2 * | 2/2006 | Mahoney et al. | 360/245.7 |

* cited by examiner

*Primary Examiner* — A. J. Heinz
(74) *Attorney, Agent, or Firm* — Saile Ackerman LLC; Stephen B. Ackerman; Rosemary L. S. Pike

(57) ABSTRACT

In a balanced head gimbal assembly for improved seeking performance, a slider having a magnetic head with a set of read elements to read data and a set of write elements to write data, an air-bearing surface, and a non-air-bearing surface is coupled to a suspension. The suspension includes a loadbeam, a flexure, and a balancing weight. The loadbeam is coupled to an actuator arm. The flexure, coupled to the loadbeam, has a window through which a dimple, coupled to the loadbeam, contacts a dimple contact point. The balancing weight, coupled to the flexure, has a configuration which permits alignment of a center of mass of the head gimbal assembly with the dimple contact point.

24 Claims, 16 Drawing Sheets

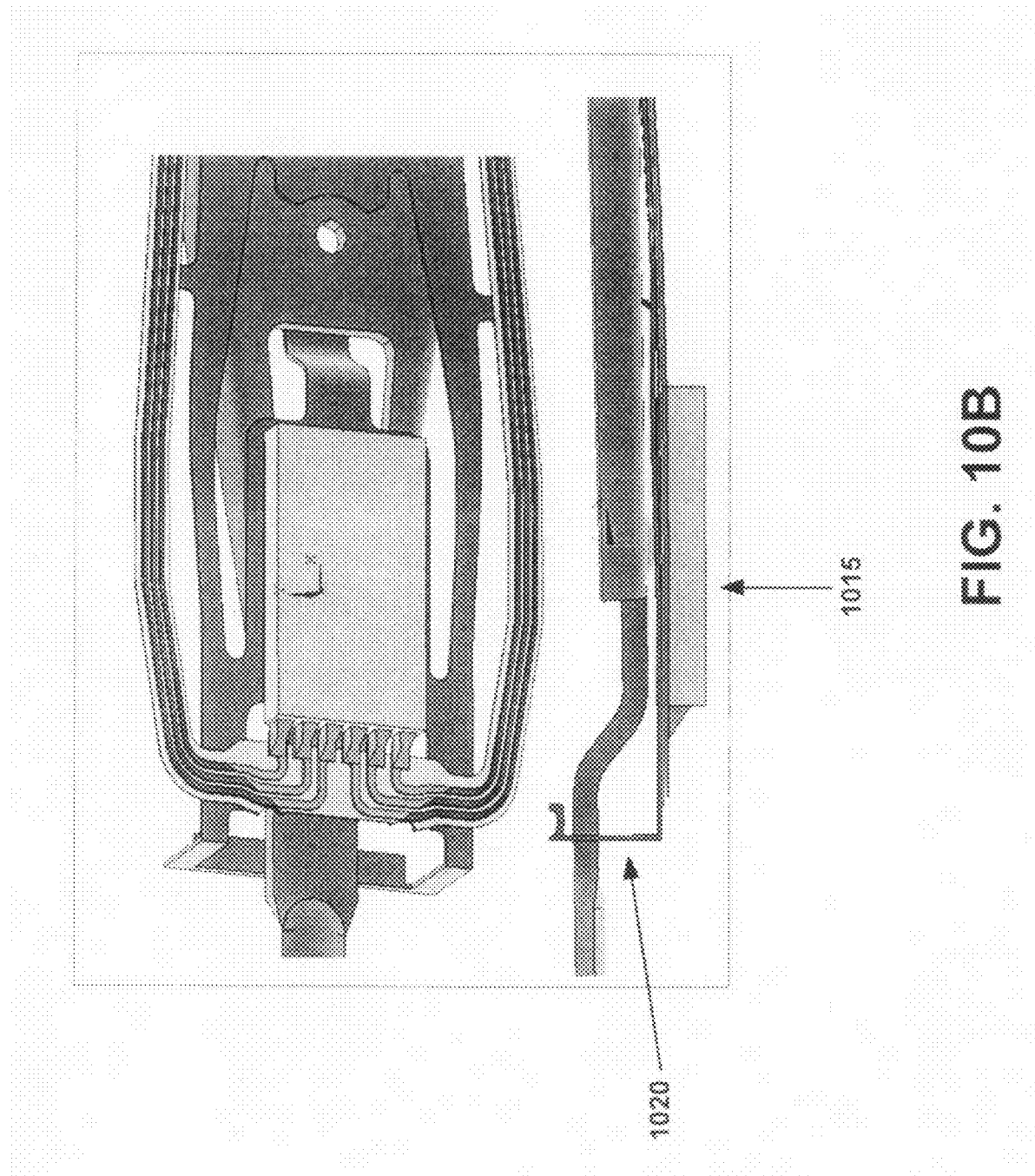

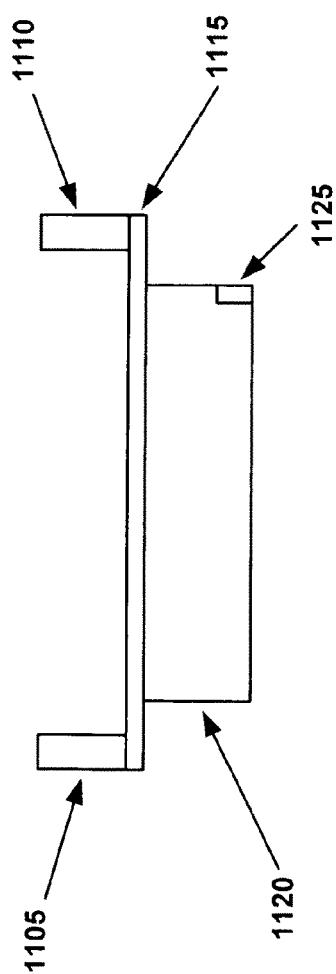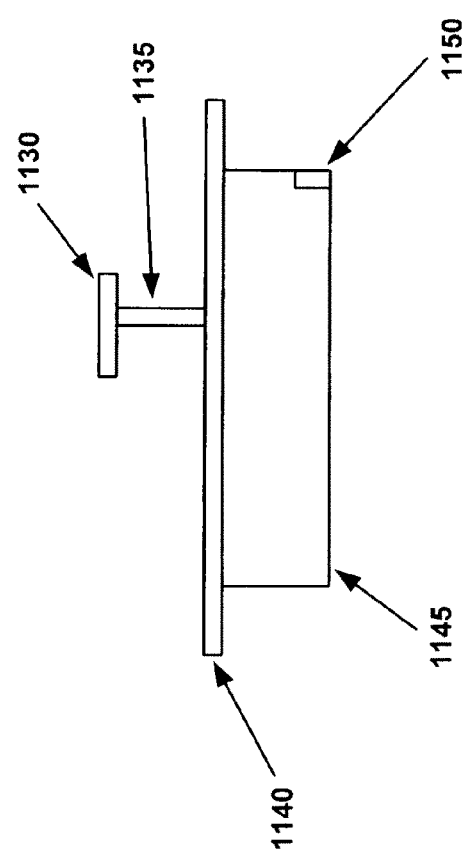
FIG. 11A
FIG. 11B

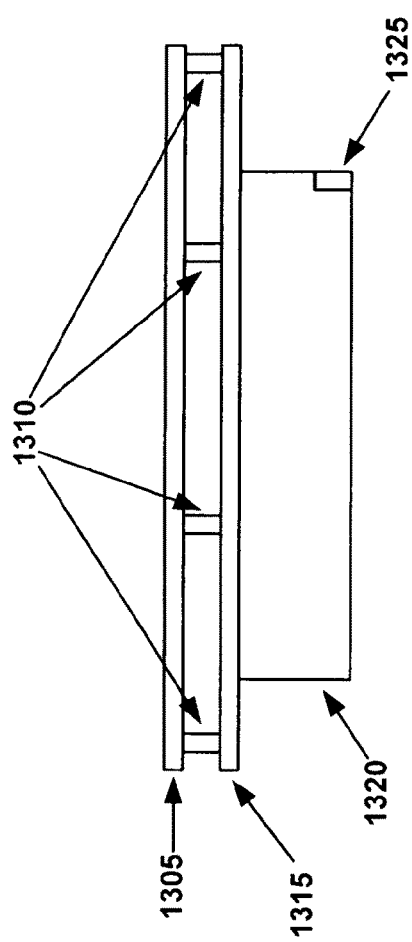
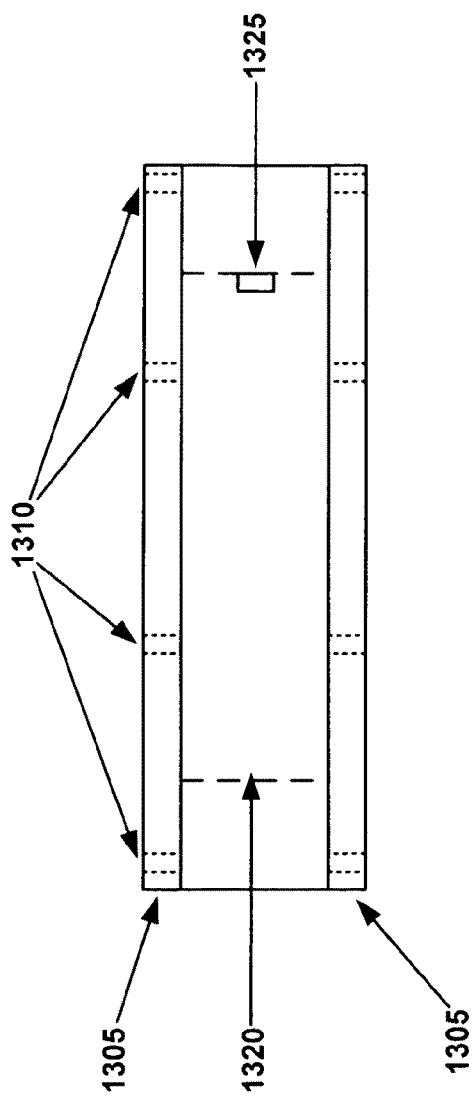

US 8,027,127 B2

METHOD OF REDUCING SLIDER ROLL TORQUE BY BALANCING HEAD GIMBAL ASSEMBLY FOR IMPROVED SEEKING PERFORMANCE

This is a divisional of U.S. patent application Ser. No. 11/691,437 filed on 26 Mar. 2007, now U.S. Pat. No. 7,907,368, which is herein incorporated by reference in its entirety.

BACKGROUND INFORMATION

The present invention relates to a head gimbal assembly (HGA) for use in a magnetic information storage disk drive. In particular, the present invention relates to a HGA design having superior performance during track accessing.

FIG. 1 illustrates a conventional hard disk drive design. Hard disk drives are used as the major storage unit in a computer. Hard disk drives operate by storing and retrieving digitized information onto and from a rotating disk. The reading and writing of the information onto the disk is performed by a magnetic "head" embedded in a ceramic "slider" which is mounted on a piece of a metal spring, called a suspension. The suspension consists of many components, such as a load beam, a gimbal, traces, a hinge and a base plate. The suspension provides two functions: mechanical support and electrical connection between the "head" and the "pre-amplifier." The slider flies on the rotating disk with about a 10 nm gap, also known as the flying height, between the slider and the disk. In order to make the slider fly stably and reliably at such a small gap, various characteristics of the suspension design must be carefully designed, such as vertical stiffness (Kz), gimbal pitch and roll stiffness (Kp, Kr), and gimbal static attitude (pitch and roll static attitude (PSA and RSA respectively)).

The disk drive also typically includes a servo system that operates to move a slider or a head over a defined track on a disk surface. This operation is called a seeking operation. The performance or data transfer rate of the disk drive is a key performance characteristic. In order to achieve a higher performance/data transfer rate, seeking has become more aggressive, and is increasingly characterized by high speeds, high acceleration, and high deceleration. During the seek process, the slider flying height may change due to: (1) changes of airflow speed and direction; and (2) changes in suspension loads applied on the slider during acceleration and deceleration. The changes in suspension loads applied on the slider during acceleration and deceleration primarily occur due to the torque in the roll direction (for an in-line actuator). FIGS. 2a and 2b show examples of seeking acceleration and roll torque relative to seeking speed and as a function of time. For these examples, during the acceleration process, a negative roll torque is applied to the slider approximately at 0.5 ms. A positive roll torque change occurs during the deceleration process approximately at 6 ms. These roll torque changes may reduce the clearance between the slider and the disk, and may cause the slider to contact the disk, resulting in a drive failure. Therefore, the change in roll torque needs to be improved.

Changes in the roll torque may equal the acceleration or deceleration multiplied by the roll inertia moment. Conventionally, the roll torque may be reduced by reducing the acceleration or deceleration, but doing so may result in a negative effect on drive performance. Therefore, it is preferable to reduce the roll inertia moment instead. Further, during certain seek operations, the servo may lose control of the actuator, resulting in a loss of control over the acceleration or deceleration of the slider. In these situations, the actuator may slam into crash stops at the inner or outer diameters of the disk. During this process, the acceleration or deceleration of the slider may reach as high as ten times the normal seek operation acceleration or deceleration. Moreover, as a result of the loss of actuator control, the slider may contact the disk, resulting in severe damage to the disk and the slider. One solution for preventing damage to the disk was proposed in U.S. Pat. No. 6,125,017, issued to Misso et al., in which the crash stop was re-designed. Alternatively, another solution for preventing disk damage is to increase the breaking distance. This solution is not desirable as a larger braking distance directly reduces the disk area that can be used for data storage. Thus, it is even more preferable to reduce the roll inertia moment.

Thus, it would be desirable to have an improved head-gimbal assembly that reduces the roll inertia moment of a slider.

BRIEF DESCRIPTION OF THE DRAWINGS

FIG. 10b illustrates one embodiment of a balanced head gimbal assembly without a ramp limiter.

FIG. 11a illustrates one embodiment of a balancing weight configuration for a head gimbal assembly.

FIG. 11b illustrates one embodiment of a balancing weight configuration for a head gimbal assembly.

FIGS. 13a and 13b respectively illustrate a top and a side view of one embodiment of a balancing weight configuration for a head gimbal assembly.

DETAILED DESCRIPTION

A head gimbal assembly balanced to improve seeking performance is disclosed. The head gimbal assembly may include a slider with a magnetic head having a set of read elements to read data and a set of write elements to write data. The slider may have an air-bearing surface and a non-air-bearing surface. The head gimbal assembly also may have a suspension, including a loadbeam, a flexure, and a balancing weight. The loadbeam may be coupled to an actuator arm. The flexure may be coupled to the loadbeam and the slider and may have a window through which a dimple, coupled to the loadbeam, may contact a dimple contact point. The balancing weight may be coupled to the flexure and may have a configuration which permits the alignment of a center of mass of the head gimbal assembly with the dimple contact point.

Figure 1:
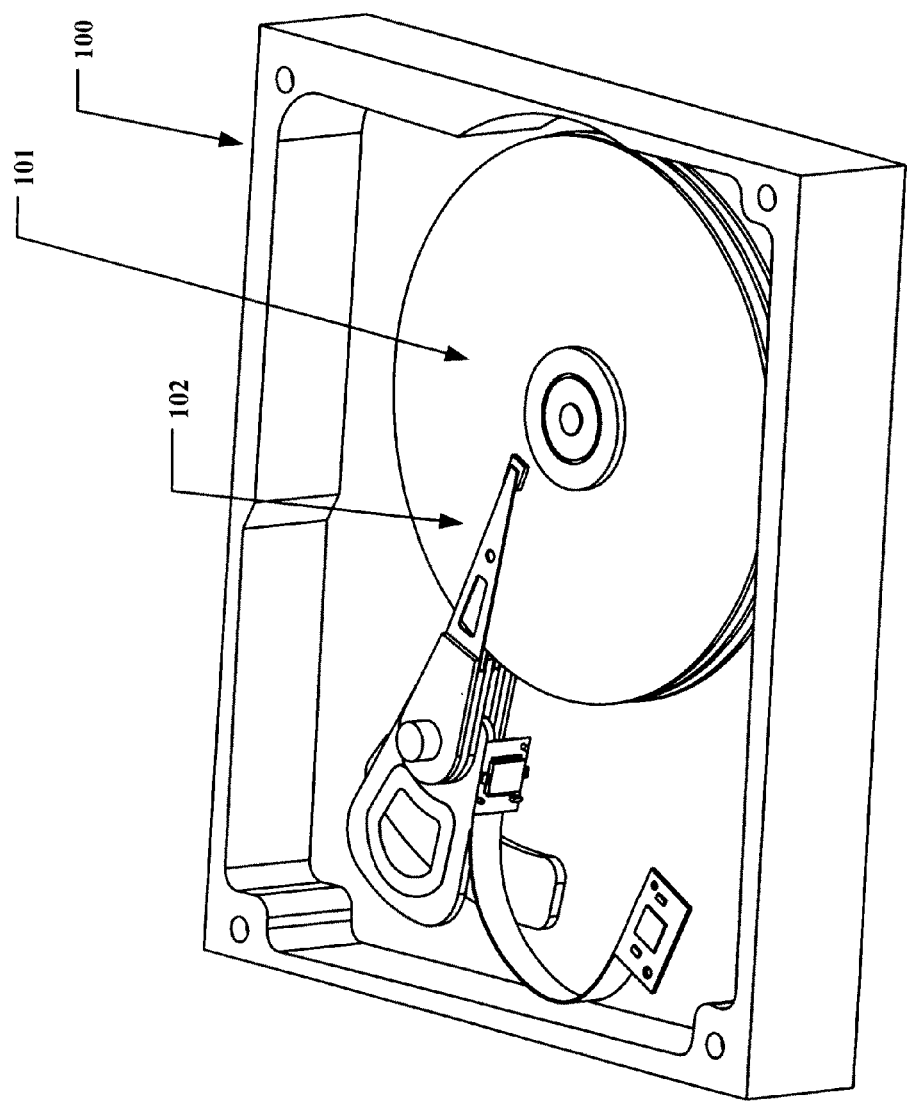
FIG. 1 illustrates a conventional hard disk drive design.
Figure 2A:
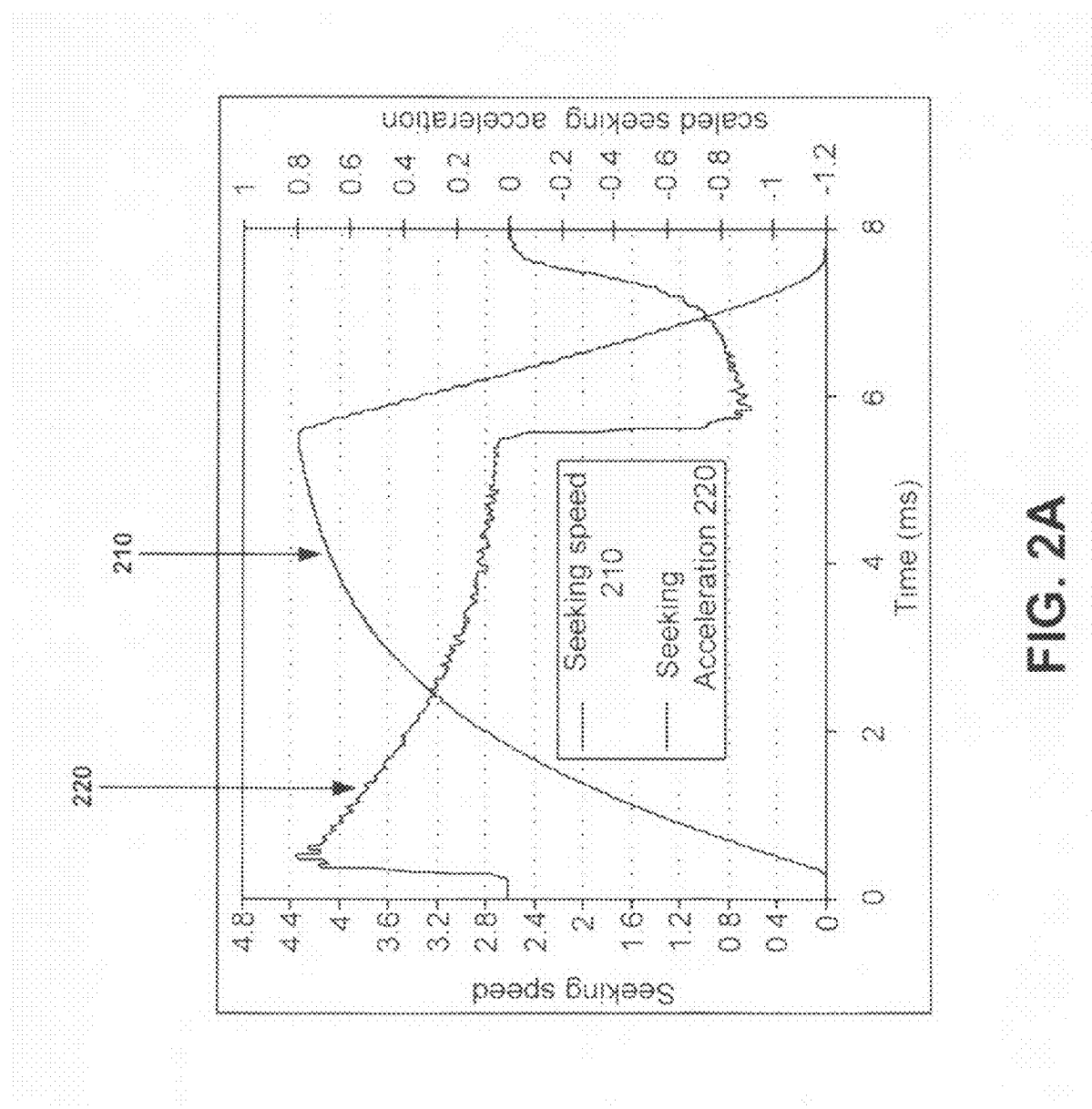
FIG. 2a illustrates a graphical example of seeking speed and acceleration as a function of time.
Figure 2B:
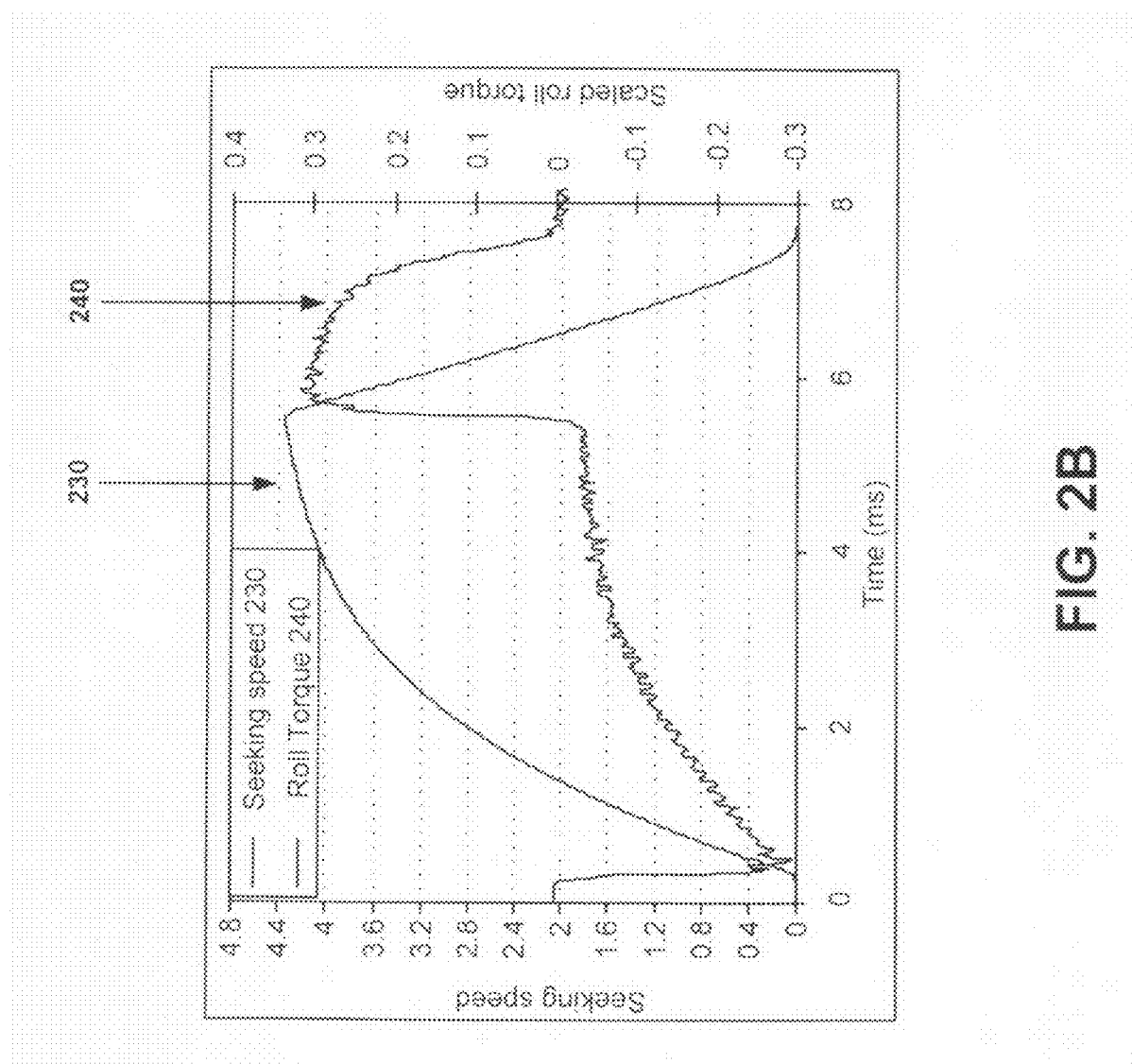
FIG. 2b illustrates a graphical example of seeking speed and roll torque exerted on a slider as a function of time.
Figure 3:
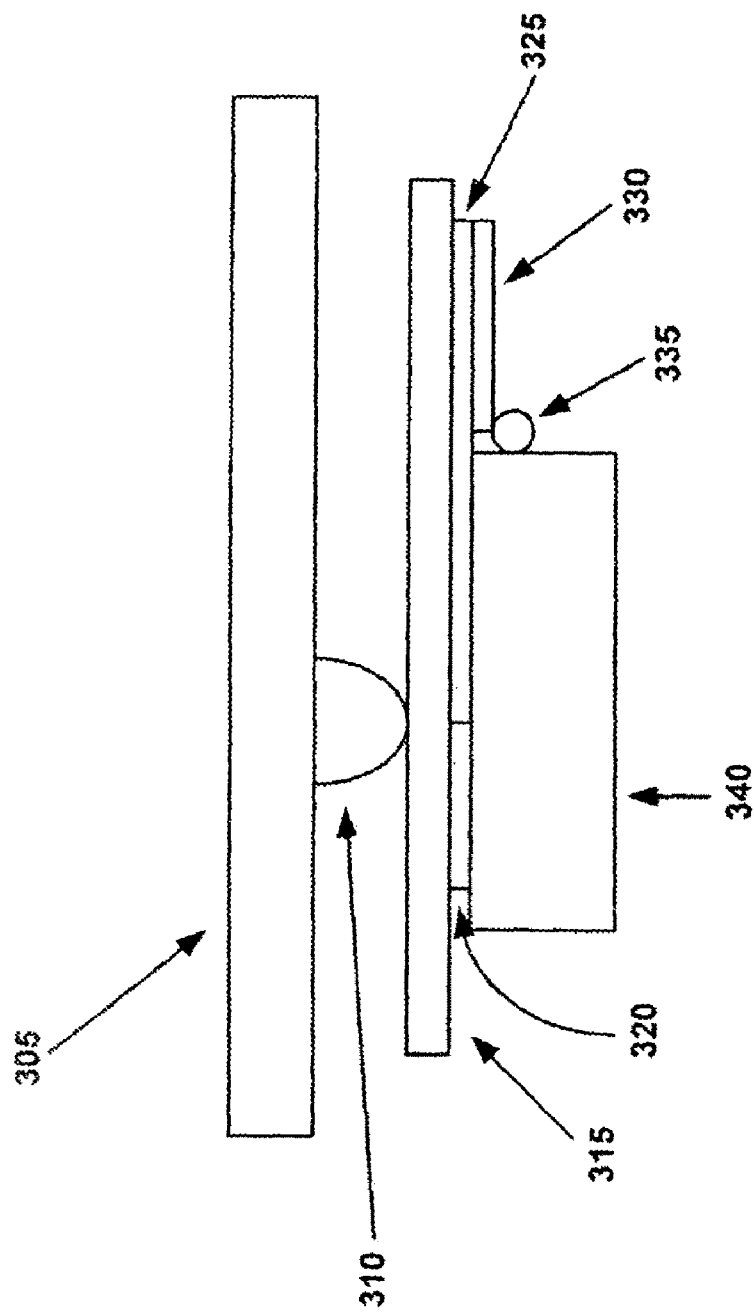
FIG. 3 illustrates one embodiment of a conventional head gimbal assembly.

FIG. 3 illustrates one embodiment of a conventional head gimbal assembly. The head gimbal assembly (HGA) may include a slider 340 and a suspension to support the slider 340. The suspension may include a loadbeam 305 attached to an actuator arm (not shown). The actuator arm may position and move the HGA over various portions of a magnetic disk to read and/or write data to and from the disk. A flexure, including a flexure tongue 315, may be coupled or attached to the loadbeam 305. The flexure may maintain relative in-plane alignment with the loadbeam 305 while permitting the slider 340 to "pitch" and "roll" with respect to the loadbeam 305. A flexible portion of the loadbeam 305 (not shown) may be bent elastically to yield a gram load, or reaction force, which is transmitted to the slider through a dimple 310, causing the slider to be pressed downward toward the surface of the disk. The slider 340 may be attached or coupled to the flexure tongue 315 using epoxy 320 and/or a polymer 325, such as polyimide, both of which are known in the art. The slider 340 also may be electrically connected to an electrical trace 330, such as a copper trace, using a conductive material 335, such as a solder ball or a gold ball.

Figure 4:
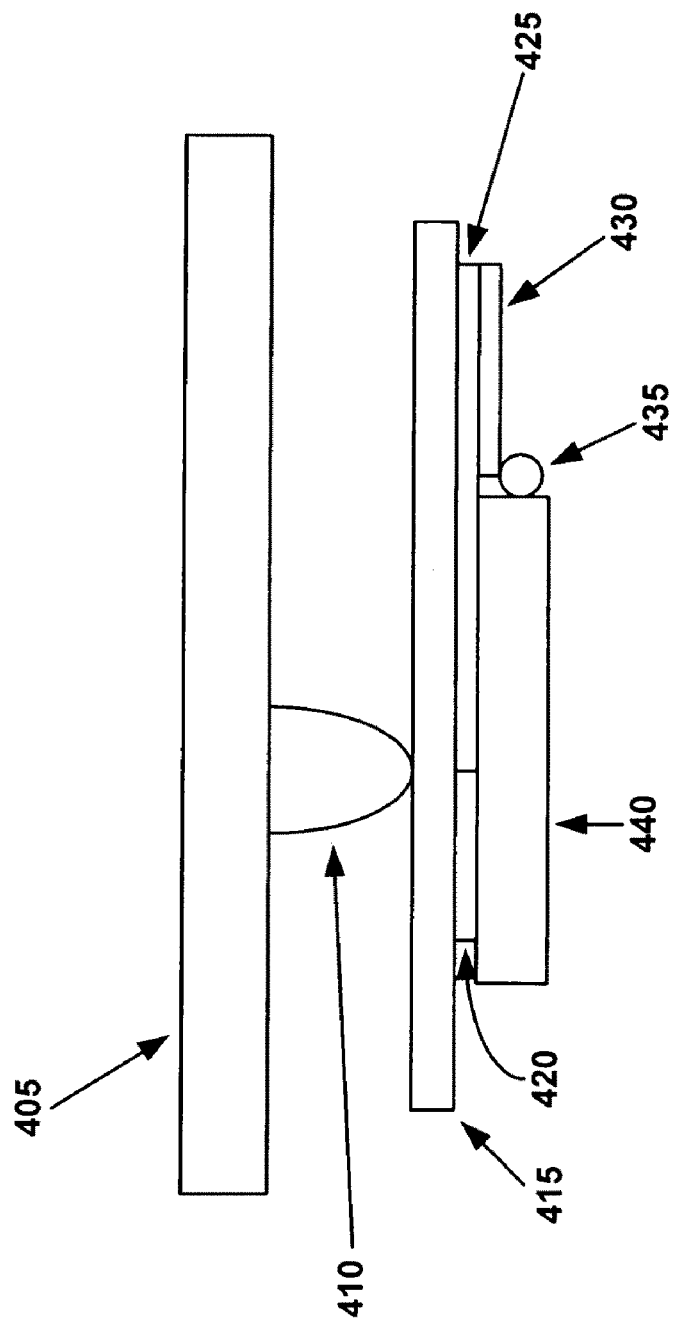
FIG. 4 illustrates one embodiment of a thin slider for reducing roll torque.
Figure 5:
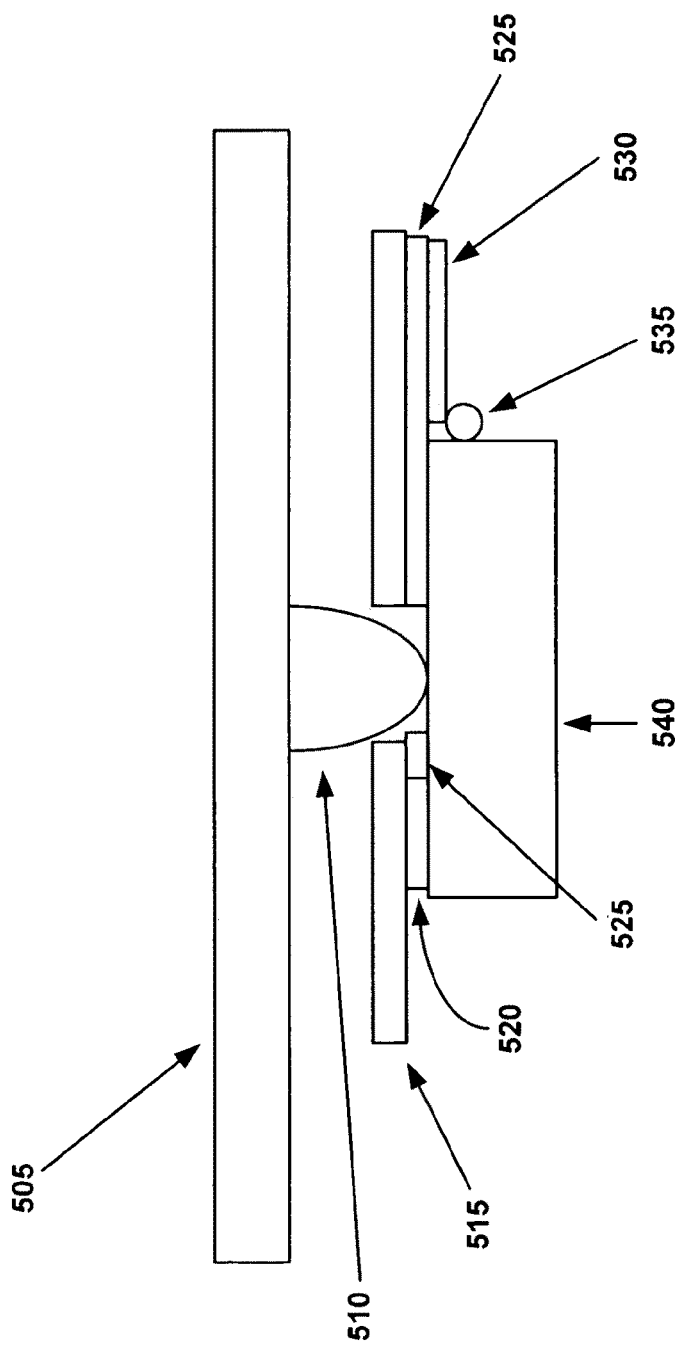
FIG. 5 illustrates one embodiment of a head gimbal assembly for reducing roll torque.
Figure 8:
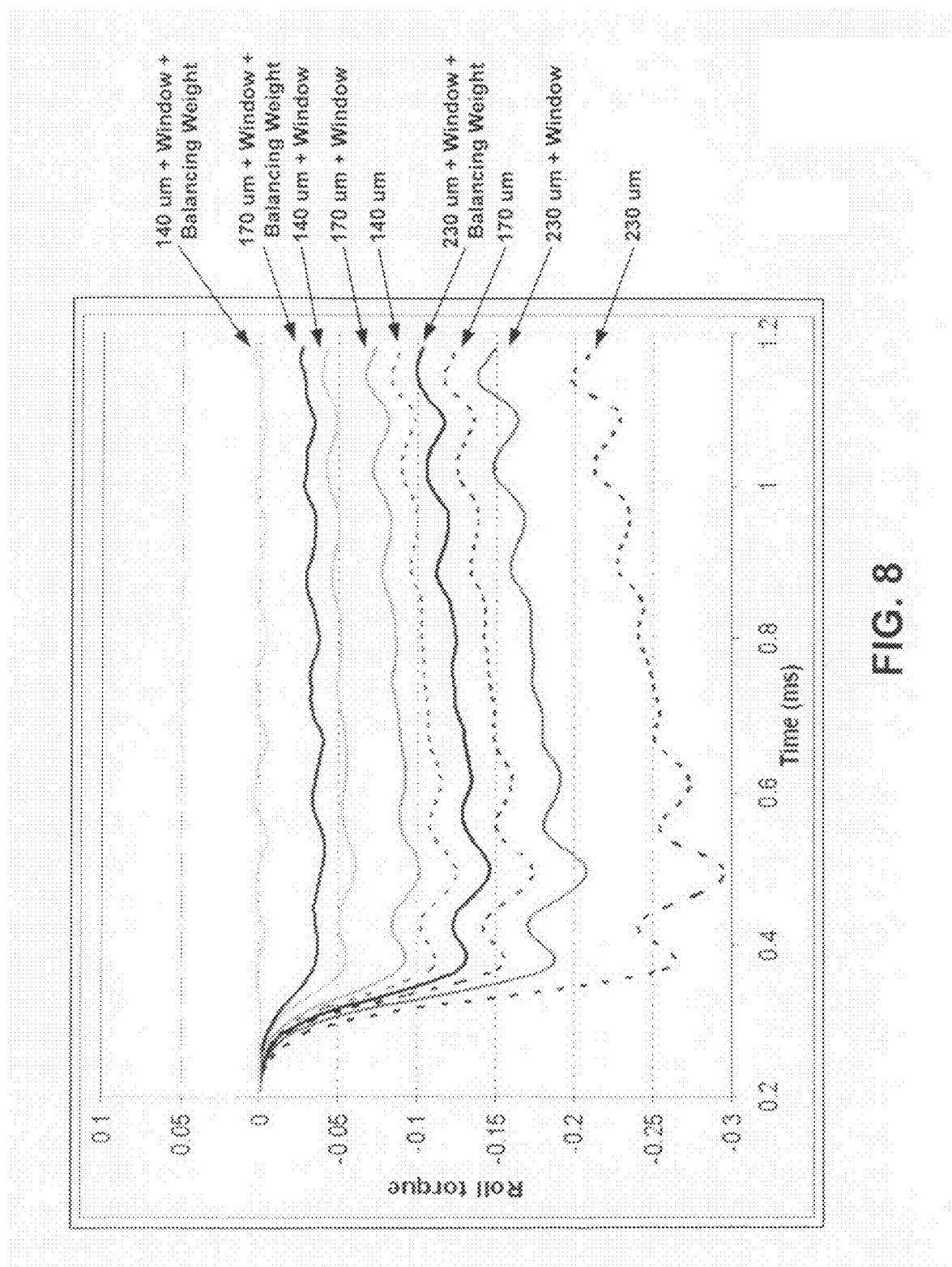
FIG. 8 illustrates a graph showing the roll torque applied on various slider embodiments as a function of time.
Figure 9:
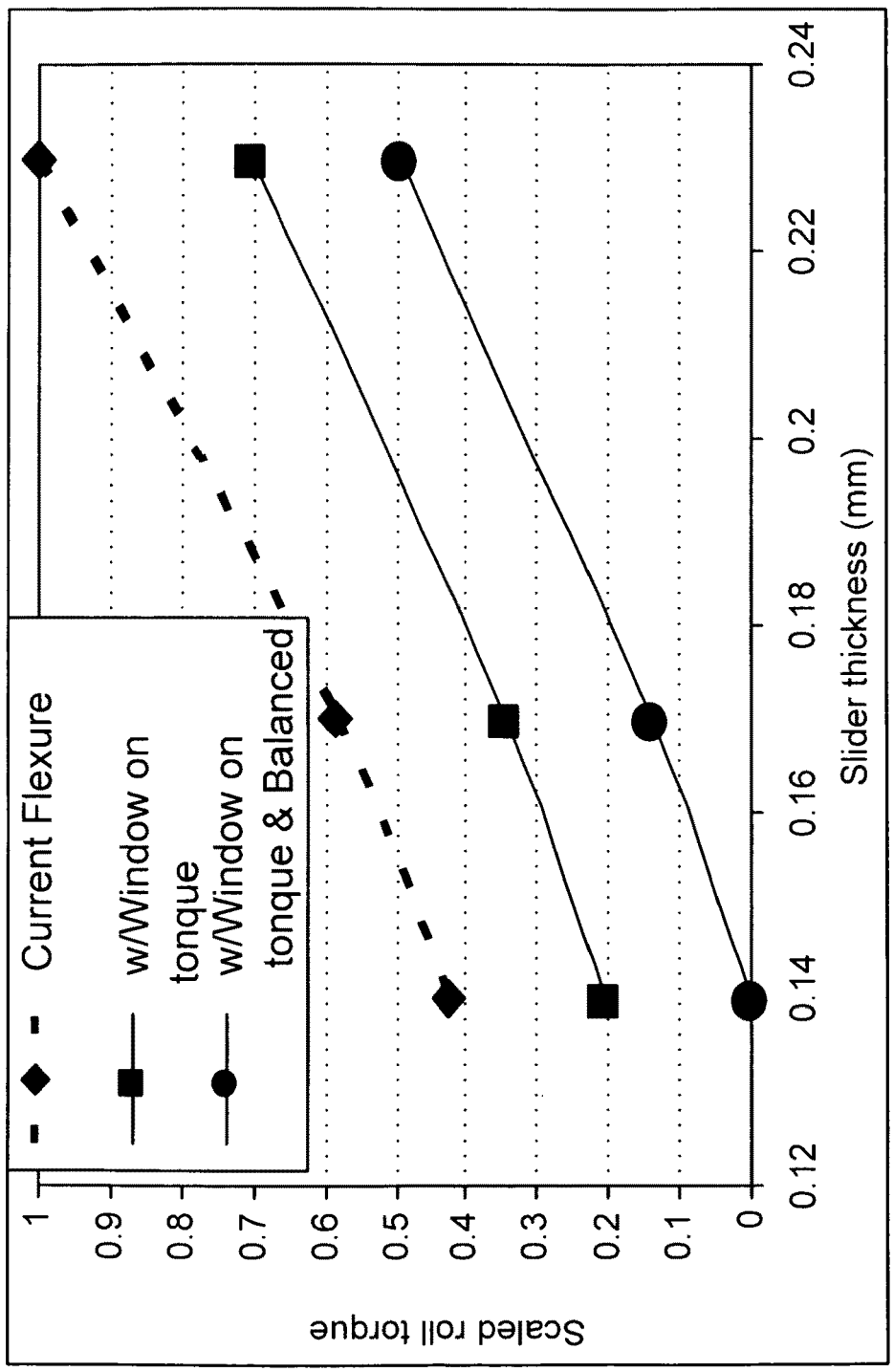
FIG. 9 illustrates a graph showing the roll torque applied on various slider embodiments as a function of the thickness of a slider.

FIG. 4 illustrates one embodiment of a thin slider for reducing roll torque. Conventionally, sliders have a thickness greater than 180 micrometers. By reducing the thickness of a slider 440 to either 170 micrometers or 140 micrometers, the thinner slider 440 may have a smaller inertia and a smaller distance (moment arm) between the center of mass of the HGA and a dimple contact point, thus reducing the roll torque exerted on the slider 440 during a seek operation. All other elements in FIG. 4 are equivalent to corresponding elements in FIG. 3, similarly numbered except for the first digit. As shown in FIG. 8, reducing the thickness of the slider 440 may reduce the roll torque exerted on the slider during seeking by various amounts depending on the thickness of the slider 440. Also, FIG. 9 illustrates scaled roll torque exerted on a slider as a function of slider thickness. As the graph shows, by reducing the thickness of the slider 440 from 230 micrometers (as commonly found in the art) to 170 micrometers may reduce the roll torque by approximately 40%. FIG. 5 illustrates one embodiment of a head gimbal assembly for reducing roll torque. In this embodiment, roll torque exerted on a slider during seeking may be reduced by creating a "window" or gap in the flexure tongue 515, thereby exposing a portion of the non-air-bearing surface of the slider 540. The window in the flexure tongue 515 may permit a dimple 510 to bypass the thickness of the flexure tongue 515 and polymer layer 525 and directly contact the non-air-bearing surface of the slider 540. Having the dimple 510 directly contact the non-air-bearing surface of the slider 540 may reduce the length of the roll moment arm approximately 30 micrometers for a conventional HGA design. Despite the reduction in the length for the roll moment arm, manufacturing and testing a suspension having a flexure window as described in this embodiment may be complicated, as the dimple 510 is unable to engage the flexure tongue 515 before the slider 540 is coupled to the flexure 515. This complication may prevent the control and measurement of the gimbal static attitudes and dimple contact force. Despite the manufacturing and testing complications, a HGA having a flexure window may greatly reduce the roll torque exerted on the slider as compared to a conventional HGA, and as shown in FIGS. 8 and 9. All other elements in FIG. 5 are equivalent to corresponding elements in FIG. 4, similarly numbered except for the first digit.

Figure 6:
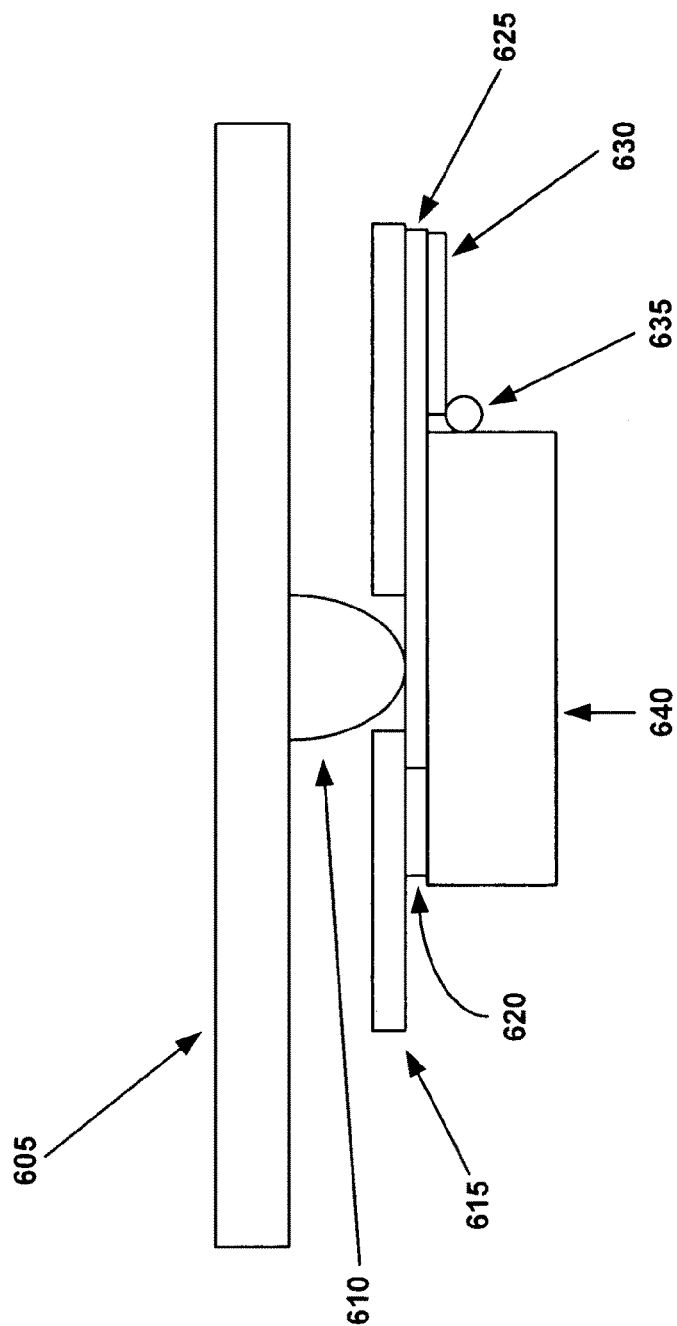
FIG. 6 illustrates one embodiment of a head gimbal assembly for reducing roll torque.

FIG. 6 illustrates one embodiment of a head gimbal assembly for reducing roll torque. In this embodiment, roll torque exerted on a slider during seeking may be reduced by creating a "window" or gap in the flexure tongue 615, which in one embodiment may be a stainless steel sheet, thereby exposing a portion of the polymer layer 625. A dimple 610 may contact the exposed polymer layer 625. Advantageously, contacting the dimple 610 to the polymer layer 625 instead of the dimple 610 to the non-air-bearing surface of the slider 640, as disclosed in the embodiment of FIG. 5, may reduce the length of the roll moment arm approximately 20 micrometers for a conventional HGA design and may reduce the roll torque without the manufacturing and testing complications descried for the embodiment disclosed in FIG. 5. Additionally, contacting the dimple 610 to the polymer layer 625 may reduce dimple Hertzian contact stress since the polymer 625 is less stiff than the slider substrate. As a result, dimple wear may be reduced, and dimple topography may be better maintained throughout the life of the disk drive. The location of the dimple contact also may drift less than if the dimple contacted the surface of the flexure tongue. This embodiment also differs from and is advantageous over the HGA and method disclosed in U.S. Pat. No. 6,549,376 to Scura et al. in that in this embodiment, the dimple height is reduced, and no additional material is added to the suspension. The polymer layer 625 provides, for example, polyimide standoffs 620 and 625 between the flexure 615 and the slider 640.

Figure 7:
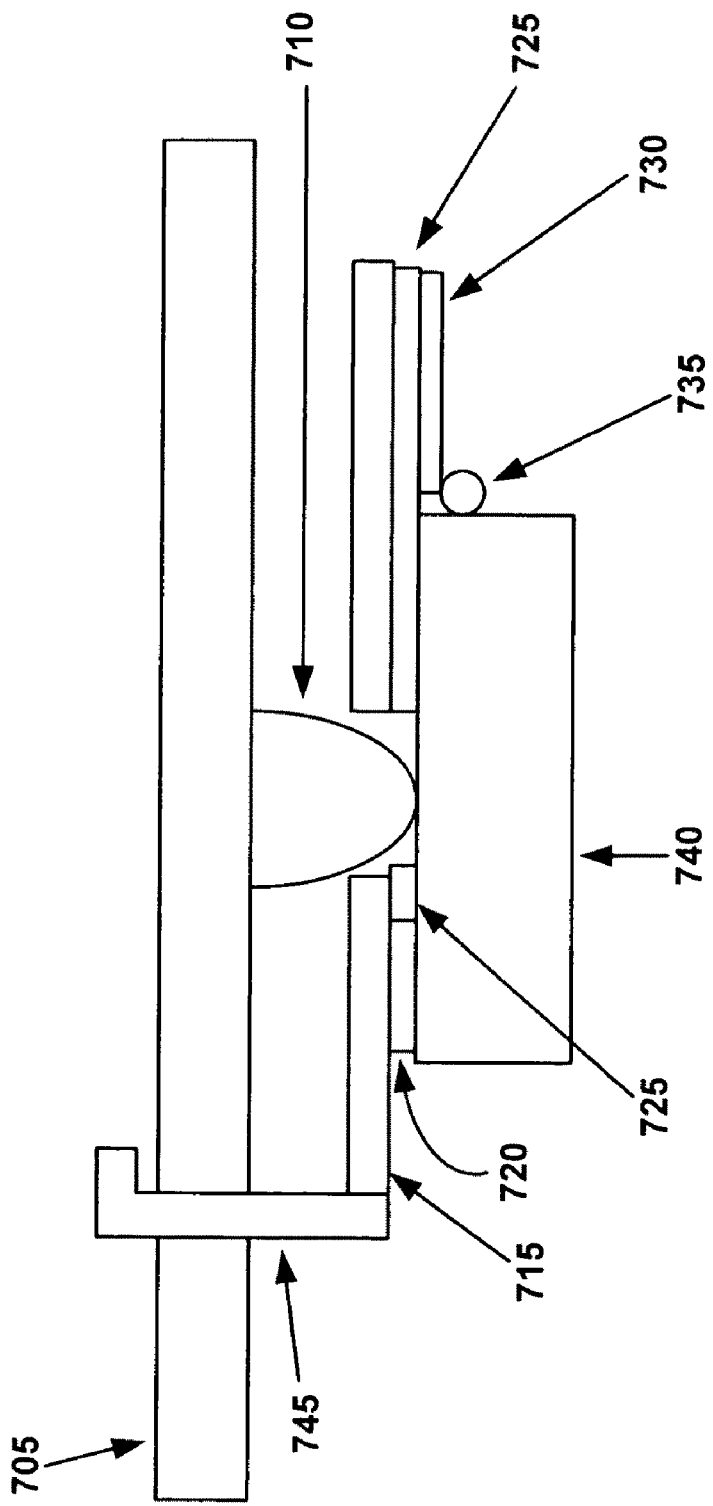
FIG. 7 illustrates one embodiment of a head gimbal assembly for reducing roll torque.

FIG. 7 illustrates one embodiment of a head gimbal assembly for reducing roll torque. In this embodiment, a flexure 715 may have a window that permits a dimple 710 to contact the surface opposing the air-bearing surface of the slider 740. Further, a substantially rigid balancing weight 745 may extend from a distal end of the flexure 715. The substantial rigidity of the balancing weight 745 may prevent the balancing weight 745 from resonating during operation of the disk drive, thus ensuring the slider flying height is not affected during operation. The balancing weight 745 may have a first component which is coupled to an extends vertically from the distal end of the flexure 715. In one embodiment, the first component may extend perpendicularly from the distal end of the flexure 715. Attached to the other end of the first component may be a second component having a horizontal orientation, in one embodiment, the second component may be parallel to the flexure 715. Together the two components of the balancing weight 745 may shift the center of mass of the slider 740 and gimbal closer to the point where the dimple 710 contacts the slider 740, thereby reducing the roll torque exerted on the slider 740 during seeking. The reduction in roll torque for this embodiment is demonstrated in FIGS. 8 and 9. All other elements in FIG. 7 are equivalent to corresponding elements in FIG. 6, similarly numbered except for the first digit.

FIG. 8 illustrates a graph showing the roll torque applied on various slider embodiments as a function of time. As previously discussed above, the roll torque exerted on the slider during seeking operation lessens if one of the above embodiments are used in place of a conventional HGA. Further, using a combination of a thinner slider, a window in a flexure and a balancing weight in a HGA may produce the greatest reduction in roll torque.

FIG. 9 illustrates a graph showing the roll torque applied on various slider embodiments as a function of the thickness of a slider. For a conventional HGA, decreasing the slider thickness may greatly reduce the roll torque exerted on the slider during seeking operation. If a HGA embodiment incorporates the window in a flexure feature, roll torque may be reduced, and the reduction may be enhanced if used in conjunction with a thinner slider and/or a balancing weight. The graph also shows that a HGA incorporating a thin slider of 140 micrometers, a window in a flexure, and a balancing weight may result in the greatest reduction in roll torque.

Figure 10A:
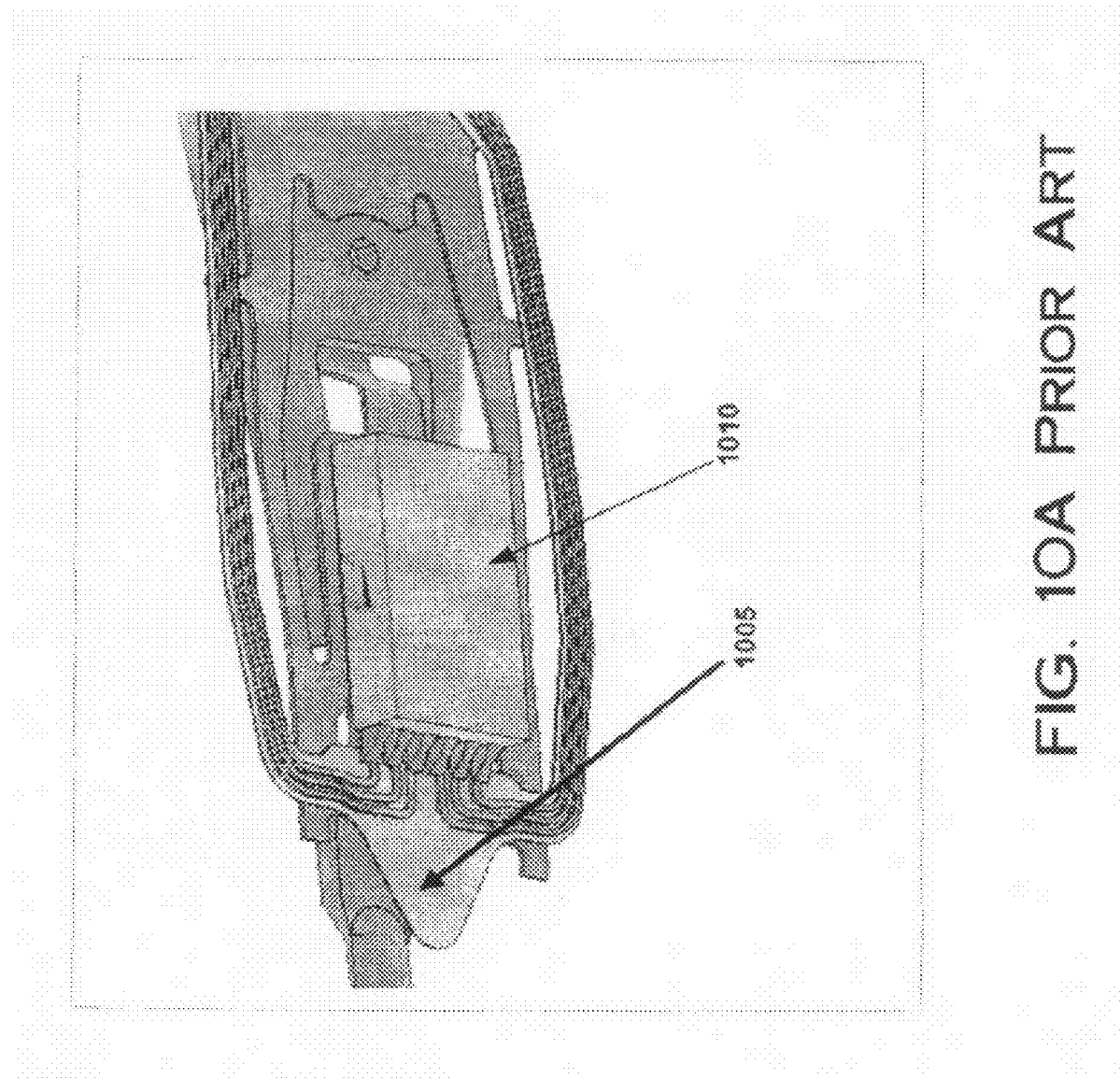
FIG. 10a illustrates an embodiment of a conventional head gimbal assembly with a ramp limiter.

FIG. 10a illustrates an embodiment of a conventional head gimbal assembly with a ramp limiter. The ramp limiter 1005 may be used in load/unload drives to protect a slider 1010 from damage if the disk is not spinning. In these situations, a HGA may rest on a load/unload ramp to prevent the slider 1010 from contacting the disk surface. The ramp limiter 1005 may also protect the slider 1010 in a shock event by contacting a ramp support to limit the movement of the slider, thereby preventing damage to the slider 1010.

FIG. 10b illustrates one embodiment of a balanced head-gimbal assembly without a ramp limiter. In this embodiment, the ramp limiter may be removed and replaced with a balancing weight 1020. The balancing weight 1020 may protect the slider during a shock event, with the upper portion of the balancing weight contacting the load beam during a shock event. As a result, the range of motion of the slider may be limited and damage to the slider may be prevented. Although the balance weight 1020 may resemble a load/unload ramp limiter, it differs drastically from conventional load/unload limiters in its mass. Unlike conventional limiters, which are designed to achieve minimal mass, the balance weight 1020 may be designed to have substantial mass for balancing purposes. The mass of the balance weight 1020 may depend on several factors, including the mass of the slider and the distance from the balance weight to the tip of the dimple (not shown in this figure). One skilled in the art should realize that a balance weight 1020 with a larger mass may be required given a larger slider mass. The balance weight 1020 may have a smaller mass given a longer distance between the balance weight and the dimple contact point.

FIG. 11a illustrates one embodiment of a balancing weight configuration for a head gimbal assembly. In this embodiment, a HGA may have a flexure 1115 coupled to a slider 1120. The slider 1120 may have a read/write head 1125 located in a trailing edge of the slider body. The HGA also may have a balancing weight configured such that the center of mass of the HGA coincides with the point where a dimple (not shown) contacts a non-air-bearing surface of the slider through a window in the flexure (not shown), thereby reducing the roll torque exerted on the slider during seeking. The balancing weight may have a first component 1105 located at a distal end of the flexure 1115. The first component 1105 may rise vertically with respect to the flexure 1115 and may be substantially rigid and have a substantial mass. The balancing weight also may have a second component 1110 located at a proximal end of the flexure 1115. The second component 1110 also may rise vertically with respect to the flexure 1115 and may be substantially rigid and have a substantial mass. In one embodiment, one of or both of the first and second components 1105, 1110 may rise perpendicularly with respect to the flexure 1115. As stated above, the mass of the balance weight components may depend on the design of the HGA, with the dimensions and mass of the various HGA components affecting the mass of the balancing weight.

FIG. 11b illustrates one embodiment of a balancing weight configuration for a head-gimbal assembly. In this embodiment, a HGA may have a flexure 1140 coupled to a slider 1145 which has a read/write head 1150 in its trailing edge. A balancing weight may be configured to shift the center of mass of the HGA to coincide with the contact point of the dimple and the slider back side (not shown), thereby reducing the roll torque experienced by the slider during seeking. In this configuration, the balancing weight may have a first component 1135 located at and coupled to a point between the proximal and distal ends of the flexure 1140. The first component 1135 may rise vertically with respect to the flexure 1140 and may be substantially rigid and have a substantial mass. In one embodiment, the first component 1135 may rise perpendicularly with respect to the flexure 1140. The balancing weight may have a second component 1130 coupled to the first component 1135 and oriented horizontally. In one embodiment, the second component 1130 may be parallel to the flexure 1140. The second component also may be substantially rigid and have a substantial mass.

Figure 12A:
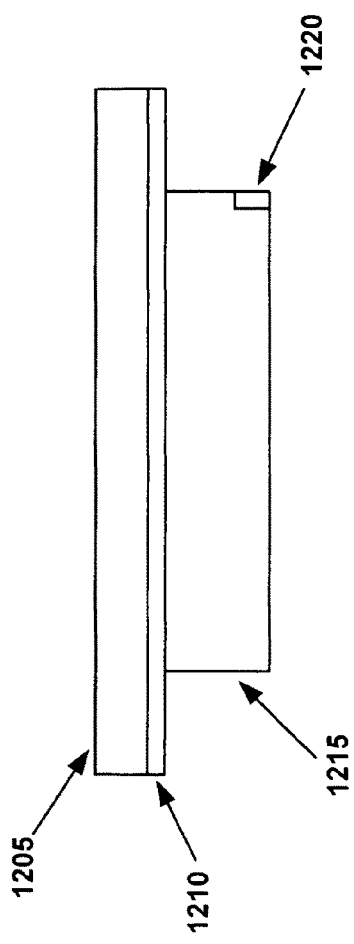
FIGS. 12a and 12b respectively illustrate a top and a side view of one embodiment of a balancing weight configuration for a head gimbal assembly.
Figure 12B:
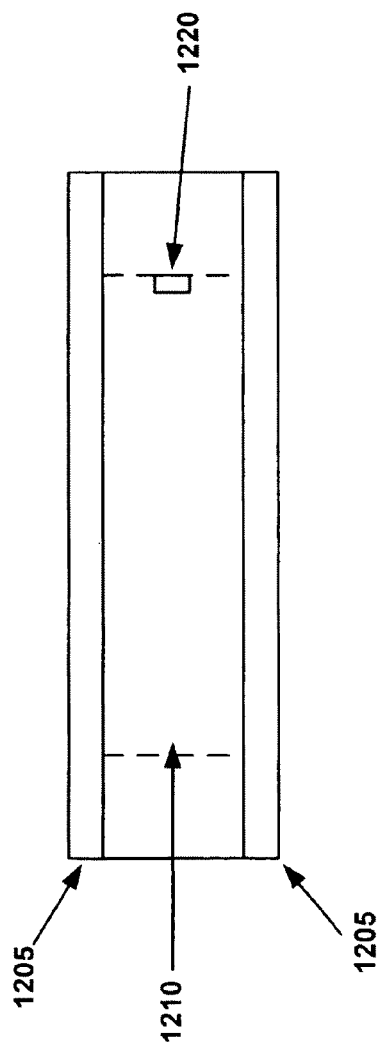

FIGS. 12a and 12b respectively illustrate a side and top view of one embodiment of a balancing weight configuration for a head gimbal assembly. In this embodiment, a HGA may have a flexure 1210 coupled to a slider 1215, which has a read/write head 1220 located in the trailing edge of the slider 1215. A balancing weight may be attached or coupled to the flexure 1210. The balancing weight may be configured in a "rail" shape running along the longitudinal axis of the flexure 1210. In one embodiment, the balancing weight may be distributed among two or more "rails" 1205 running along the longitudinal axis of the flexure and suspension. These rails 1205 may be placed on opposing edges of the suspension or flexure and aligned in the direction of the longitudinal axis of the flexure or suspension, the result of which may prevent the creation of a moment in the direction perpendicular to the disk surface (i.e., the slider may not yaw during seeking) due to lateral acceleration. In one embodiment, the balancing weight components 1205 may be placed on opposing sides of the suspension or flexure and oriented in the direction of the longitudinal axis of the flexure or suspension, running at least the length of the slider, and thereby resulting in the stiffening the HGA and minimization of the dynamic effect of the balancing weight. The distribution of the balancing weight may align a center of mass of a substantially rigid portion of the HGA, including the balance weight and the slider, with the dimple contact point (not shown).

FIGS. 13a and 13b respectively illustrate a side and top view of one embodiment of a balancing weight configuration for a head gimbal assembly. A HGA may have a flexure 1315 coupled to a slider 1320. The slider 1320 may have a read/write head 1325 embedded or attached to the trailing edge of the slider 1320. The flexure 1315 may have a window, or gap, through which a dimple (not shown), coupled to a loadbeam (not shown), may contact the slider back (i.e. the non-air-bearing surface of the slider). The HGA may also have a balancing weight coupled to the flexure 1315. In this embodiment, the balancing weight may have a configuration including a first components 1305 elevated from the flexure and oriented horizontally with respect to the flexure 1315. In one embodiment, the first component 1305 may be parallel with respect to the flexure 1315. The first component may be coupled or joined to the flexure through one or more support weight components 1310 which may be located between and perpendicular to both the flexure 1315 and the first component 1305. The gaps or holes between the support components 1310 may make the balance weight more efficient by raising the center of mass of the balance weight. The holes or gaps also may reduce the airflow effect on the HGA.

Figure 14:
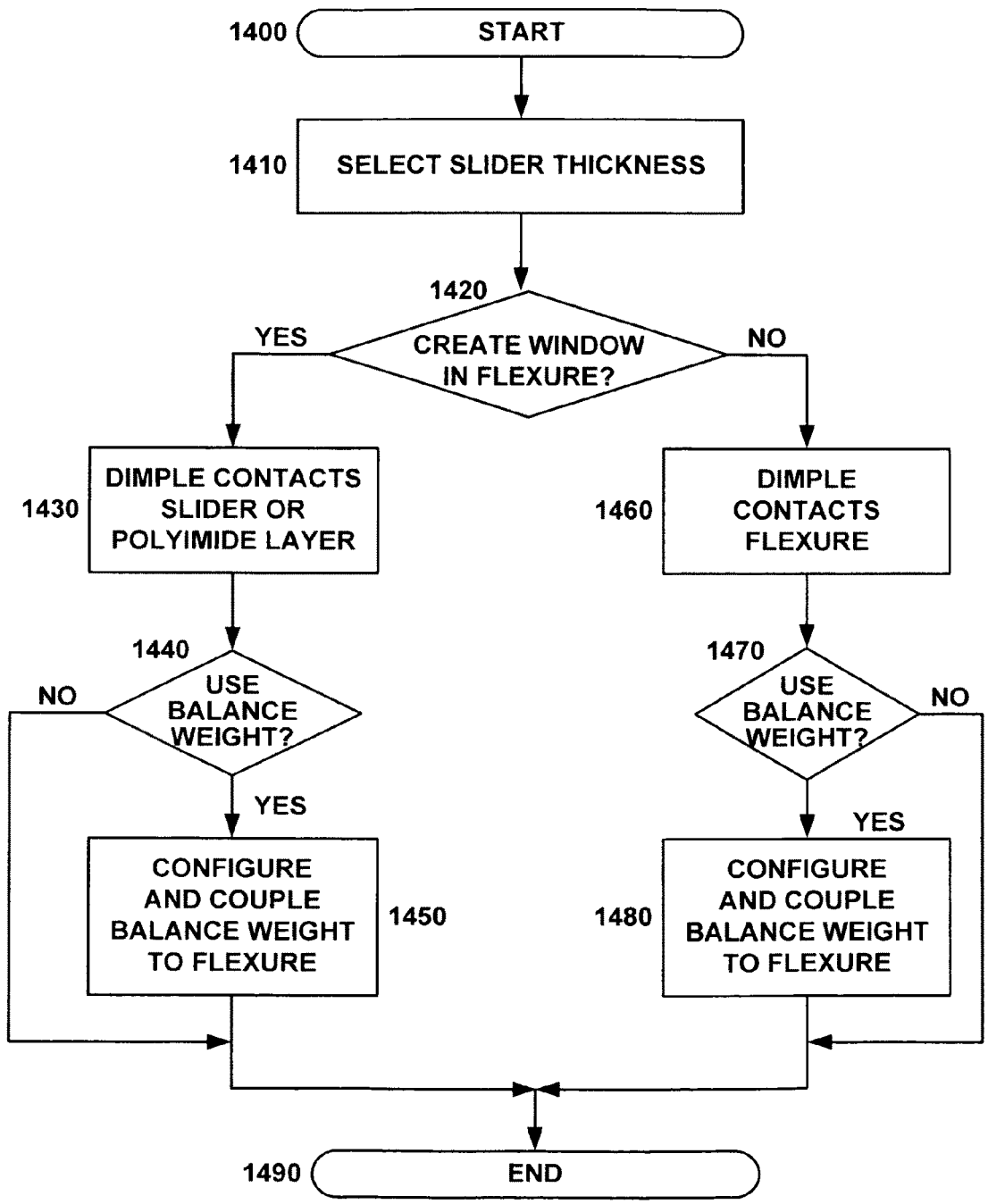
FIG. 14 illustrates in a flowchart one embodiment for reducing the roll torque exerted on a slider during a seek operation.

FIG. 14 illustrates in a flowchart one embodiment for reducing the roll torque exerted on a slider during a seek operation. In block 1410, a slider thickness for a slider in a head gimbal assembly may be selected. Conventionally, sliders may have a thickness of approximately 230 micrometers, but may be as thin as 140 micrometers. The thickness of the slider may affect the roll torque exerted on the slider during seeking, with thicker slider being subject to increased roll torque relative to thinner sliders. In decision block 1420, to reduce the roll torque alone or in combination with the selected slider thickness, a window may be created in a flexure in the head gimbal assembly. If the window is created, the window may expose a portion of a surface beneath the flexure. In one embodiment, the polymer layer sandwiched between the flexure and the slider may be exposed by the window. Alternatively, the window may be created in the flexure and underlying polymer layer, thereby exposing a non-air-bearing surface of the slider. If the window is created, in block 1430, a dimple, coupled to the loadbeam, may contact either the exposed portion of the polymer layer or the non-air-bearing surface of the slider.

In decision block 1440, either alone or in combination with the selected slider thickness and/or the window in the flexure, a balancing weight may be configured such that when the balancing weight is coupled to the flexure, the center of mass of the HGA shifts and aligns with the point at which the dimple contacts the exposed portion of the polymer layer or the non-air-bearing surface of the slider. The balancing weight may be substantially rigid and have a substantial mass. The balancing weight may have multiple configurations, each of which may result in the alignment of the HGA center of mass with the dimple contact point. In one embodiment, the balancing weight may have a first component coupled to and extending perpendicularly from a distal end of the flexure. A second component may be coupled to the first component and may be parallel or substantially parallel to the flexure. Alternatively, the balancing weight may be distributed among two or more "rails" parallel to the longitudinal axis of the flexure and located on opposing edges of the flexure. In an embodiment, the rails may be elevated from the flexure with vertical supports joining the elevated rails to the flexure. The vertical supports may be spaced apart from each other, creating "holes" which may result in the shifting of the HGA center of mass upward. The holes may also reduce the airflow effect on the HGA. In another embodiment, the balancing weight may have a first component coupled to and perpendicular with respect to the distal end of the flexure. A second component may be coupled to and perpendicular with respect to the proximal end of the flexure. In another embodiment, the balancing weight may have a first component coupled to and perpendicular with respect to the flexure at a point located between the distal end and the proximal end of the flexure. Attached to the opposite end of the first component may be a second component. The second component may be parallel or substantially parallel to the flexure. In block 1450, if used, the balancing weight configuration may be coupled to the flexure to align the HGA center of mass with the dimple contact point. If a balancing weight is not used, the process ends in block 1490.

In block 1460, if a flexure window is not created, the dimple may contact the flexure. In one embodiment, the flexure may be made of stainless steel. In decision block 1470, a balancing weight may or may not be used. If the balancing weight is used, then in block 1480, the balancing weight may be configured and coupled to the flexure. The balancing weight may have multiple configurations, each of which may result in the alignment of the HGA center of mass with the dimple contact point. Exemplary embodiments of the various balancing weight configurations are described above. If the balancing weight is not used to reduce roll torque, the process ends in block 1490. The result of the above-described method for reducing roll torque exerted on a slider during seeking may use a thinner slider, a flexure window, and a balancing weight, in various combinations or individually, to reduce roll torque.

Embodiments of the invention described above may improve the seeking performance of the HGA. While roll torque may be completely eliminated with a fully balanced HGA incorporating a thinner slider, a window in a flexure, and a balancing weight, those skilled in the art will recognize that improved HGA performance may be obtained using any of the above-mentioned and described features individually or combinations of any two features. Further, those skilled in the art will recognize that additional balance weight configurations which align the center of mass of the HGA with a dimple contact point may be employed to reduce roll torque.

Therefore, the foregoing is illustrative only of the principles of the invention. Further, those skilled in the art will recognize that numerous modifications and changes are possible, the disclosure of the just-described embodiments does not limit the invention to the exact construction and operation shown, and accordingly, all suitable modifications and equivalents fall with in the scope of the invention.

What is claimed is:

1. A method of reducing slide roll torque, comprising:
   selecting a thickness of a slider;
   creating a window in a flexure, said window exposing a dimple contact point;
   contacting a dimple coupled to a loadbeam with said dimple contact point;
   configuring a substantially rigid balancing weight to align a center of mass of a head gimbal assembly with said dimple contact point; and
   coupling said substantially rigid balancing weight to said flexure wherein at least one component of said substantially rigid balancing weight coupled to said flexure is perpendicular to both a longitudinal axis of said flexure and the plane of said flexure.

2. The method of claim 1, wherein said dimple contact point is located on a surface of a polyimide layer.

3. The method of claim 1, wherein said dimple contact point is located on a non-air-bearing surface of said slider.

4. The method of claim 1, wherein said balancing weight is configured to extend from a distal end of said flexure, said balancing weight having a first component coupled to and perpendicular to a longitudinal axis of said flexure and a second component coupled to said first component and parallel to said longitudinal, axis of said flexure, said second component capable of contacting said loadbeam during a shock event.

5. The method of claim 1, wherein said balancing weight is configured to be distributed among two components both parallel to a longitudinal axis of said flexure and located along opposing longitudinal edges of said flexure.

6. The method of claim 5, wherein said two components each have a portion parallel to and elevated from said longitudinal edge of said flexure and a plurality of vertical supports coupled between and perpendicular to said portion and said flexure along said longitudinal axis of said flexure, wherein said plurality of vertical supports are spaced apart a variable distance from each other.

7. The method of claim 1, wherein said balancing weight is configured to have a first component coupled to a distal end of said flexure and perpendicular to both a longitudinal axis of said flexure and said plane of said flexure and a second component coupled to a proximal end of said flexure and perpendicular to both said longitudinal axis of said flexure and said plane of said flexure.

8. The method of claim 1, wherein said balancing weight is configured to have a first component perpendicular to both a longitudinal axis of said flexure and said plane of said flexure and coupled to a point located between a distal end and a proximal end of said flexure and a second component coupled to said first component and parallel to said flexure.

9. A method of reducing slide roll torque in a head gimbal assembly, comprising:
    selecting a thickness of a slider;
    creating a window in a flexure, said window exposing a dimple contact point;
    contacting a dimple coupled to a loadbeam with said dimple contact point;
    forming a plurality of polyimide standoffs between said flexure and said slider, wherein said dimple contact point is located on a surface of said plurality of polyimide standoffs;
    configuring a substantially rigid balancing weight to align a center of mass of said head gimbal assembly with said dimple contact point; and
    coupling said substantially rigid balancing weight to said flexure wherein at least one component of said substantially rigid balancing weight coupled to said flexure is perpendicular to both a longitudinal axis of said flexure and the plane of said flexure.

10. The method of claim 9, wherein said dimple contact point is located on a surface of a polyimide layer.

11. The method of claim 9, wherein said dimple contact point is located on a non-air-bearing surface of said slider.

12. The method of claim 9, wherein said balancing weight is configured to extend from a distal end of said flexure, said balancing weight having a first component coupled to and perpendicular to a longitudinal axis of said flexure and a second component coupled to said first component and parallel to said longitudinal axis of said flexure, said second component capable of contacting said loadbeam during a shock event.

13. The method of claim 9, wherein said balancing weight is configured to be distributed among two components both parallel to a longitudinal axis of said flexure and located along opposing longitudinal edges of said flexure.

14. The method of claim 13, wherein said two components each have a portion parallel to and elevated from said longitudinal edge of said flexure and a plurality of vertical supports coupled between and perpendicular to said portion and said flexure along said longitudinal axis of said flexure, wherein said plurality of vertical supports are spaced apart a variable distance from each other.

15. The method of claim 9, wherein said balancing weight is configured to have a first component coupled to a distal end of said flexure and perpendicular to both a longitudinal axis of said flexure and said plane of said flexure and a second component coupled to a proximal end of said flexure and perpendicular to both said longitudinal axis of said flexure and said plane of said flexure.

16. The method of claim 9, wherein said balancing weight is configured to have a first component perpendicular to both a longitudinal axis of said flexure and said plane of said flexure and coupled to a point located between a distal end and a proximal end of said flexure and a second component coupled to said first component and parallel to said flexure.

17. A method of reducing slide roll torque in a disk drive, comprising:
    selecting a thickness of a slider;
    providing a magnetic data storage medium to store data;
    providing a flexure to maintain a spacing between said slider and said magnetic data storage medium;
    creating a window in said flexure, said window exposing a dimple contact point;
    contacting a dimple coupled to a loadbeam with said dimple contact point;
    forming a plurality of polyimide standoffs between said flexure and said slider, wherein said dimple contact point is located on a surface of said plurality of polyimide standoffs;
    configuring a substantially rigid balancing weight to align a center of mass of said head gimbal assembly with said dimple contact point; and
    coupling said substantially rigid balancing weight to said flexure.

18. The method of claim 17, wherein said dimple contact point is located on a surface of a polyimide layer.

19. The method of claim 17, wherein said dimple contact point is located on a non-air-bearing surface of said slider.

20. The method of claim 17, wherein said balancing weight is configured to extend from a distal end of said flexure, said balancing weight having a first component coupled to and perpendicular to a longitudinal axis of said flexure and a second component coupled to said first component and parallel to said longitudinal axis of said flexure, said second component capable of contacting said loadbeam during a shock event.

21. The method of claim 17, wherein said balancing weight is configured to be distributed among two components both parallel to a longitudinal axis of said flexure and located along opposing longitudinal edges of said flexure.

22. The method of claim 21, wherein said two components each have a portion parallel to and elevated from said longitudinal edge of said flexure and a plurality of vertical supports coupled between and perpendicular to said portion and said flexure along said longitudinal axis of said flexure, wherein said plurality of vertical supports are spaced apart a variable distance from each other.

23. The method of claim 17, wherein said balancing weight is configured to have a first component coupled to a distal end of said flexure and perpendicular to both a longitudinal axis of said flexure and said plane of said flexure and a second component coupled to a proximal end of said flexure and perpendicular to both said longitudinal axis of said flexure and said plane of said flexure.

24. The method of claim 17, wherein said balancing weight is configured to have a first component perpendicular to both a longitudinal axis of said flexure and said plane of said flexure and coupled to a point located between a distal end and a proximal end of said flexure and a second component coupled to said first component and parallel to said flexure.

* * * * *